(12) United States Patent
Lim

(10) Patent No.: US 9,248,878 B2
(45) Date of Patent: Feb. 2, 2016

(54) LUGGAGE CARRIER FOR A TWO WHEELED VEHICLE

(76) Inventor: Sau Leong Lim, Singapore (SG)

( * ) Notice: Subject to any disclaimer, the term of this patent is extended or adjusted under 35 U.S.C. 154(b) by 599 days.

(21) Appl. No.: 12/513,662

(22) PCT Filed: Nov. 5, 2007

(86) PCT No.: PCT/SG2007/000374
§ 371 (c)(1),
(2), (4) Date: May 5, 2009

(87) PCT Pub. No.: WO2008/060245
PCT Pub. Date: May 22, 2008

(65) Prior Publication Data
US 2010/0065596 A1    Mar. 18, 2010

(30) Foreign Application Priority Data
Nov. 13, 2006    (EP) ..................................... 06255813

(51) Int. Cl.
*B62J 9/00* (2006.01)
*B62H 5/00* (2006.01)
*B62H 5/20* (2006.01)

(52) U.S. Cl.
CPC . *B62J 9/00* (2013.01); *B62H 5/001* (2013.01); *B62H 5/20* (2013.01)

(58) Field of Classification Search
CPC .............. B62J 9/00; B62H 5/001; B62H 5/20
USPC ......... 224/413, 418, 423, 425, 428, 433, 435, 224/447
See application file for complete search history.

(56) References Cited

U.S. PATENT DOCUMENTS

| | | | | |
|---|---|---|---|---|
| 3,625,405 A * | 12/1971 | Kezar et al. | ................... | 224/413 |
| 4,861,088 A * | 8/1989 | Fedrigo | ........................ | 296/57.1 |
| 4,907,428 A * | 3/1990 | Nakashima et al. | ............ | 70/264 |
| 4,992,789 A * | 2/1991 | Czerwinski | ................... | 340/984 |
| 5,123,691 A * | 6/1992 | Ginn | ............................. | 296/37.1 |
| 5,727,835 A * | 3/1998 | Krush et al. | .................. | 296/37.6 |
| 6,081,186 A | 6/2000 | Adams | | |
| 6,428,076 B2 * | 8/2002 | Sumada et al. | ............... | 296/37.1 |
| 6,481,605 B1 | 11/2002 | Visenzi | | |
| 6,513,689 B2 * | 2/2003 | Vincenzo | ....................... | 224/435 |
| 6,631,835 B2 * | 10/2003 | Fang | .............................. | 224/413 |
| 7,036,852 B2 * | 5/2006 | Cho | ................................ | 292/33 |
| 2002/0027497 A1 | 3/2002 | Sumada et al. | | |
| 2004/0118889 A1 | 6/2004 | Hamilton | | |
| 2006/0112746 A1 * | 6/2006 | Thompson | ...................... | 70/257 |
| 2006/0118585 A1 * | 6/2006 | Ognissanti et al. | ............ | 224/413 |

FOREIGN PATENT DOCUMENTS

EP    1 063 157 A1    12/2000
EP    1078848 A1 *    2/2001
(Continued)

*Primary Examiner* — J. Gregory Pickett
*Assistant Examiner* — Todd Anderson
(74) *Attorney, Agent, or Firm* — Pillsbury Winthrop Shaw Pittman LLP

(57) ABSTRACT

A luggage carrier for a two wheeled vehicle comprising an open topped container secured to the vehicle. The open topped container having a hinged lid, the lid adapted to provide a seal for the open topped container. The luggage carrier also has a releasable latch, the latch adapted to secure the container in a closed position. The luggage carrier has an alarm system for alarming the luggage carrier and a remote control mechanism for arming and disarming the alarm system.

6 Claims, 15 Drawing Sheets

(56) References Cited

FOREIGN PATENT DOCUMENTS

| EP | 1 369 344 A1 | 12/2003 |
| JP | 6-263072 A | 9/1994 |
| JP | 6263072 | 9/1994 |

* cited by examiner

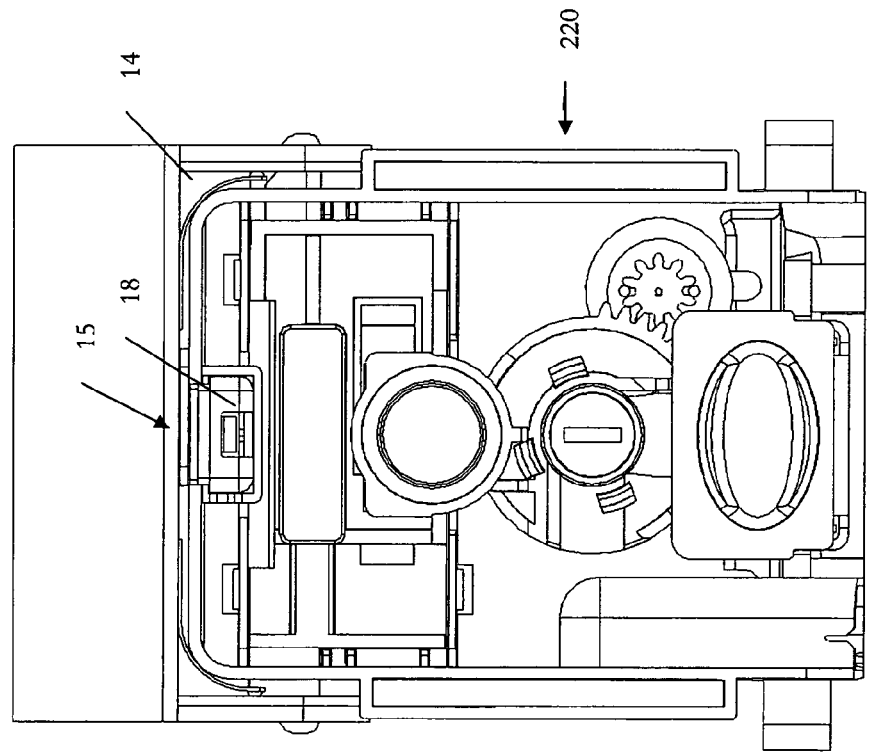
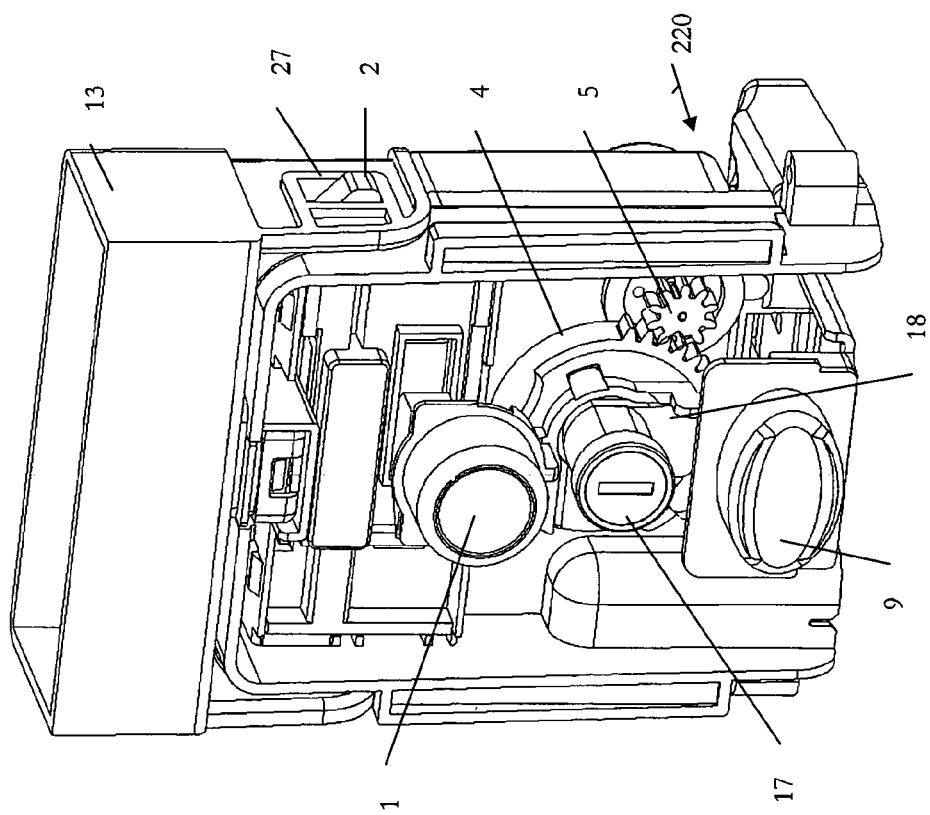

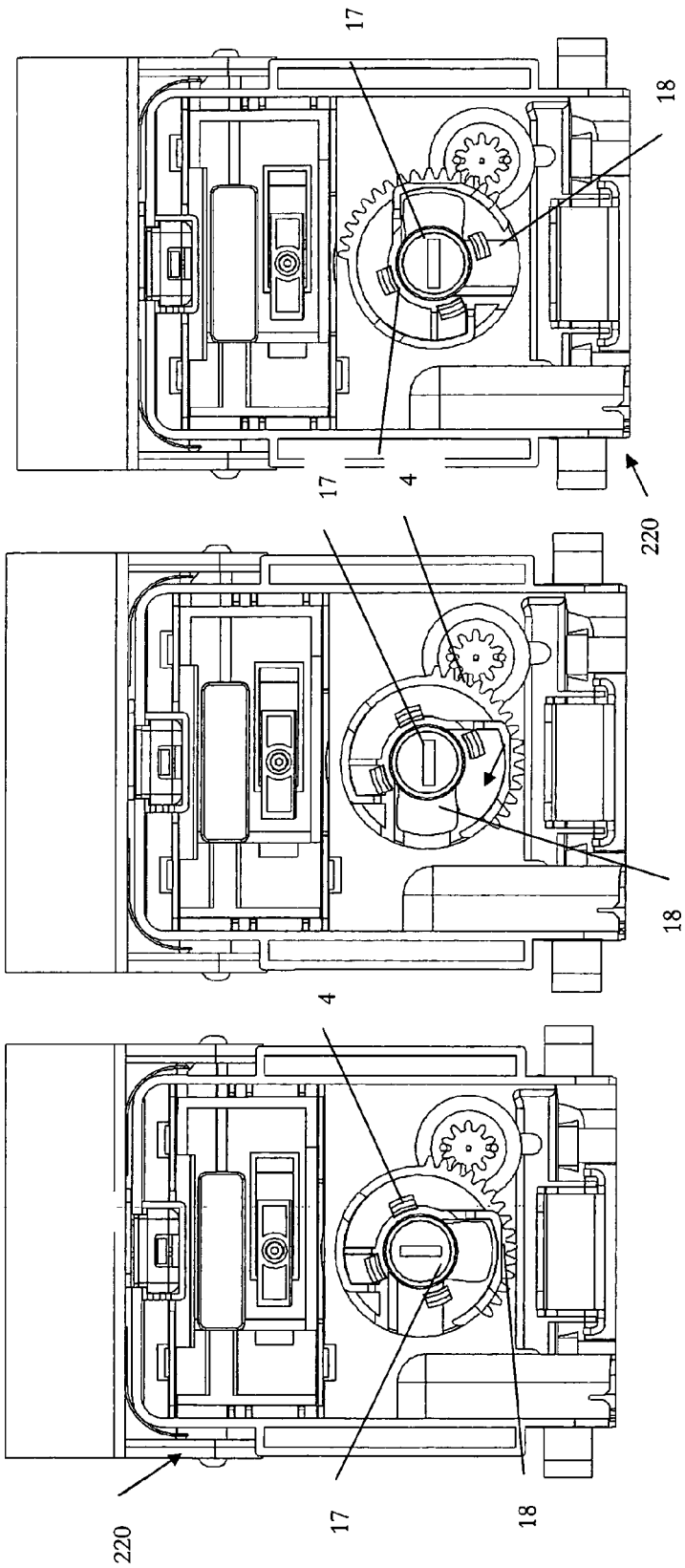

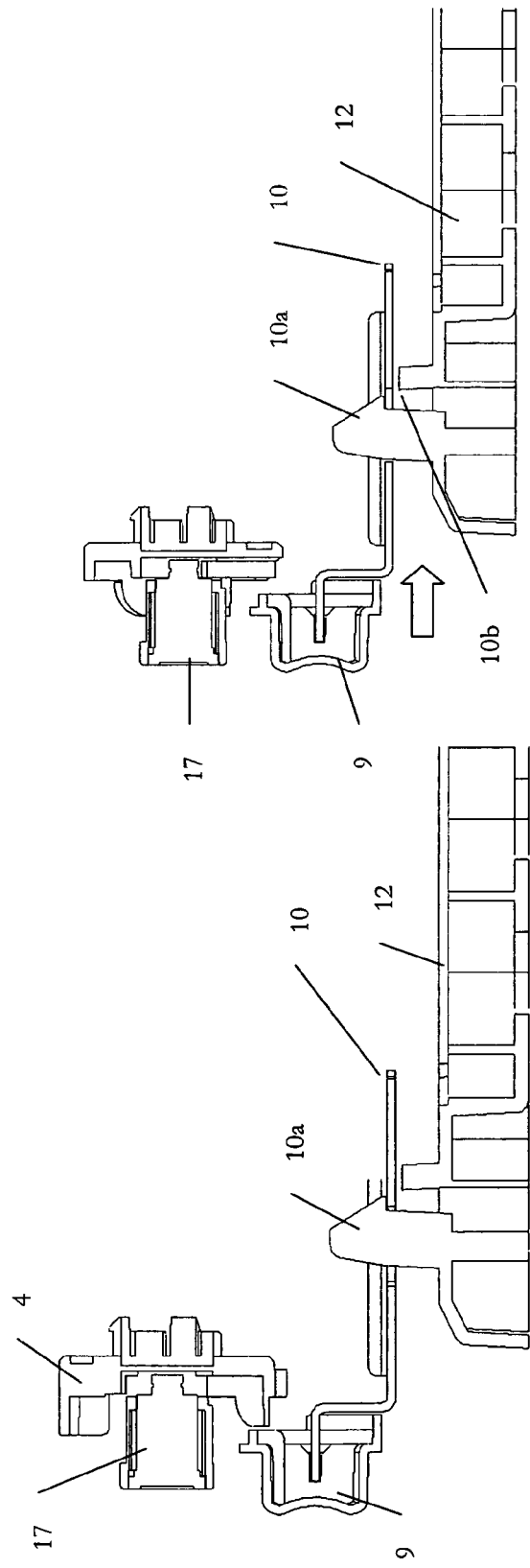

LUGGAGE CARRIER FOR A TWO WHEELED VEHICLE

RELATED APPLICATIONS

This application is the National Phase of International Application PCT/SG2007/000374 filed Nov. 5, 2007 which designated the U.S. and that International Application was published under PCT Article 21(2) in English, and claims priority to European Application Serial No. 06255813.5, filed Nov. 13, 2006, all of which applications are incorporated herein by reference in their entirety.

TECHNICAL FIELD

The invention relates a luggage carrier for two wheeled vehicles.

BACKGROUND ART

Luggage carriers for two wheeled vehicles are known. Known luggage carriers are manually locked and unlocked using a key.

It is an objective of the present invention to provide an improved luggage carrier for two wheeled vehicles or at least to provide the public or industry with a useful choice.

SUMMARY OF THE INVENTION

Accordingly in a first embodiment the invention consists in a luggage carrier for a two wheeled vehicle comprising:
  an open topped container secured to said vehicle;
  a hinged lid, adapted to provide a seal for said open topped container;
  a releasable latch, said latch adapted to secure said lid to said container in a closed position; and
  an alarm system for alarming said luggage carrier; and
  a remote control mechanism for arming and disarming said alarm system.

Preferably said luggage carrier includes a lid lock to prevent said latch from being released, said lid lock adapted to be operable by said remote control mechanism.

Preferably said lid lock and said latch are an integral mechanism.

Preferably said luggage carrier includes a frame secured to said two wheeled vehicle and said container is mounted on said frame.

Preferably said container is detachably mounted to said frame.

Preferably said detachably mounted container is secured to said frame by a lock.

Preferably said frame lock is operable by said remote control mechanism.

Preferably said frame lock is integral with said lid lock.

Preferably said frame lock is integral with said latch.

Preferably said luggage carrier includes a brake light mounted on said lid; and a power passing mechanism for operating said brake light.

BRIEF DESCRIPTION OF DRAWINGS

The luggage carrier in accordance with the invention will now be described by way of example with reference to the accompanying drawings in which:
FIG. 3 is an isometric view of the lock assembly of FIG. 1,
FIG. 4 is front view of the lock assembly,
FIGS. 13 to 15 are front views of the locking mechanising illustrating the lock in a neutral, locked and unlocked positions,
FIG. 16 is a cross section of the frame of FIG. 2 with the lock in the locked position,
FIG. 17 is a cross section of the frame of FIG. 2 with the lock in the unlocked position.

DETAILED DESCRIPTION OF INVENTION

Figure 21:
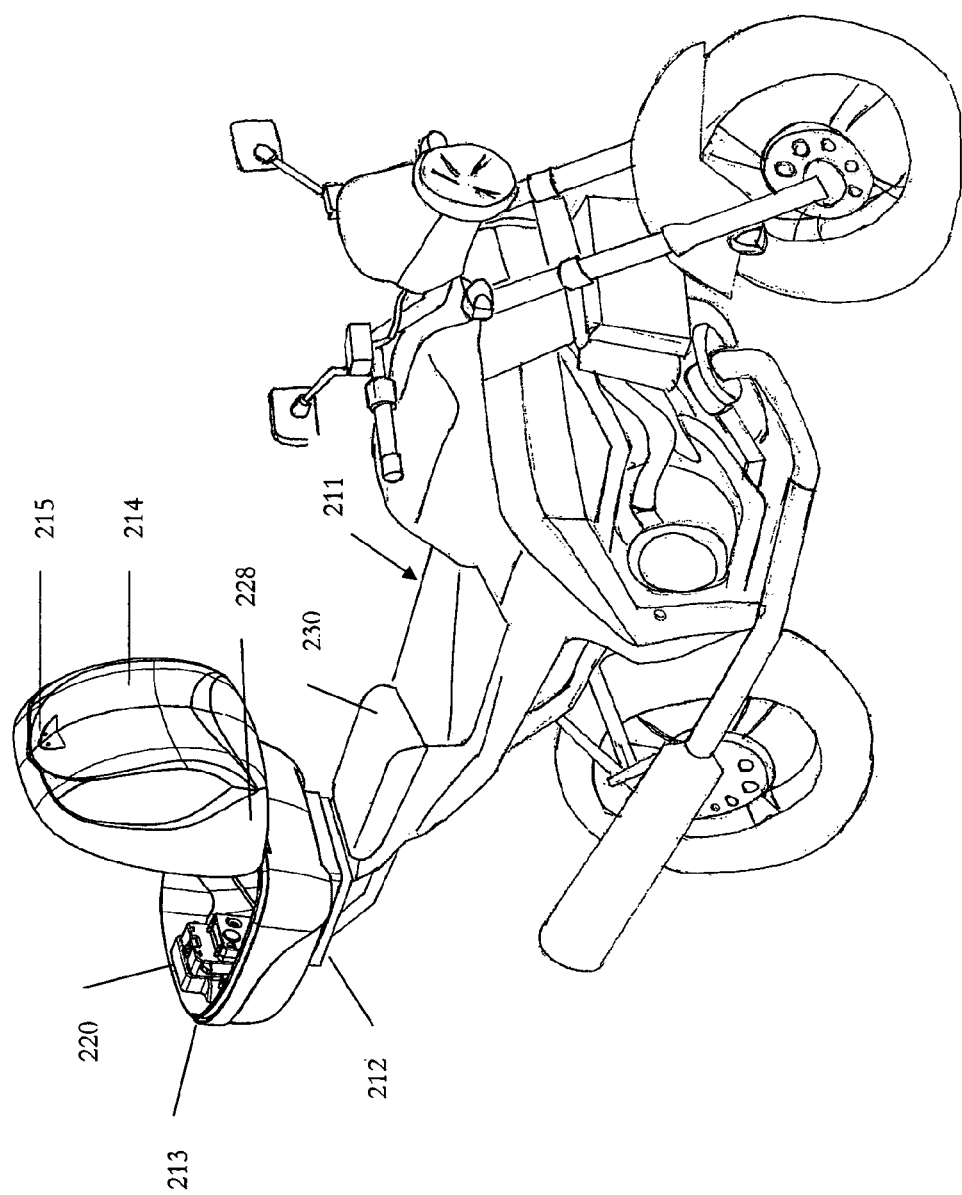
FIG. 21 is a view of the luggage carrier of the present invention on a motor cycle.

An exemplary form of the present invention is illustrated in FIG. 21 comprising a luggage carrier 210 that is attached to a two wheel vehicle 211, such as a motorcycle. The luggage carrier 210 is attached to the vehicle 211 by a frame 212 that is typically located behind the motorcycle seat 230.

The luggage carrier 210 comprises a container 213 into which a user may put luggage or helmets. The luggage carrier 210 has a lid 214 having at least one hinge 228 located at one side to the container 213 allowing the lid 214 to be raised up from and lowered down with respect to the container 213. Preferably at least one hinge 228 is located at the back of the container 213 opposite the lid locking mechanism 220. The lid 214 may be secured to the container 213 by a lock or locking mechanism 220 at another side. The lid 214 may include a light 215 that is preferably located on and integral with the lid 214.

With reference to the figures a locking mechanism 220 for securing a lid 214 to a container 213 is shown. The locking mechanism 220 (lid lock) includes a button 1 for releasing the lid 214, a two part lid lock bar 2, and a spring 3. In operation the spring 3 is biased to force the two parts of the lid lock bar 2 apart. To release the lock bars 2 the button 1 is depressed by a user which in turn pushes on an actuator 19. The actuator 19 has slopped sides and when it is pushed the actuator 19 is forced into a slot 2b in the lid lock bars 2 such that the two lid lock bars 2 are forced together and the spring 3 is compressed releasing the lid.

Figure 20:
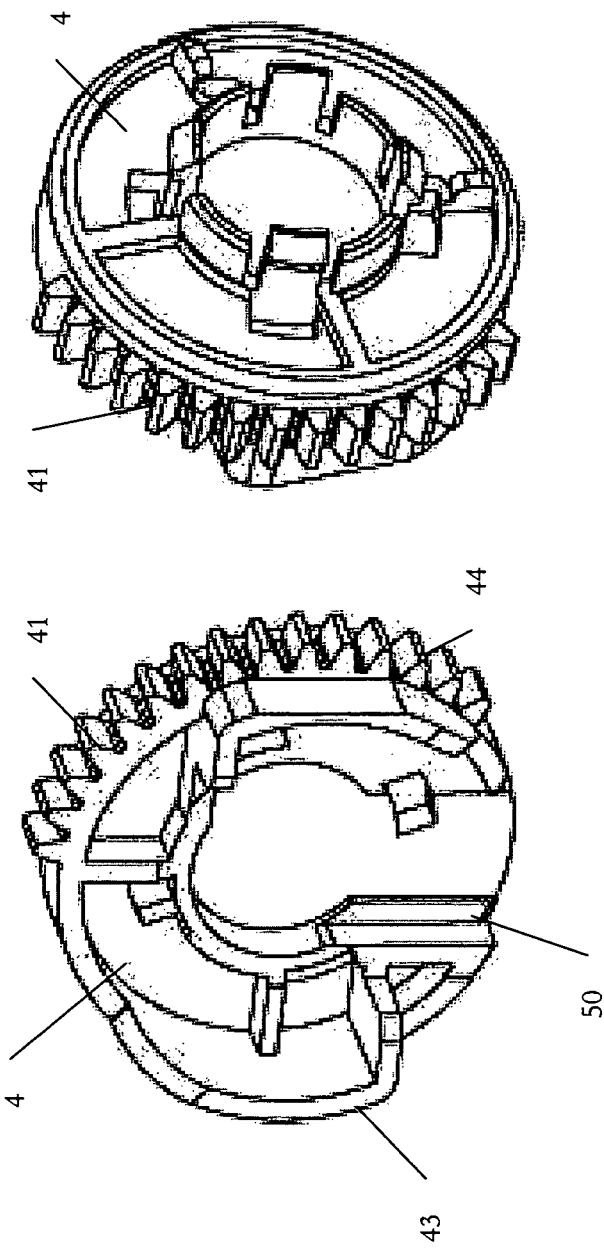
FIG. 20 is a front and back view of the cam of the lock assembly.

The locking mechanism 220 is housed in housing 7. The locking mechanism 220 also includes a cam 4 and a pinion gear 5. The pinion gear 5 is directly connected to a motor 6 that is housed in the interior of the locking mechanism housing 7. The cam is only able to turn approximately one quarter, as the cam teeth 41 illustrated in FIG. 20 occupy only approximately a quarter of the circumference of the cam 4. A motor controller 8 controls the operation of the motor 6.

Figure 1:
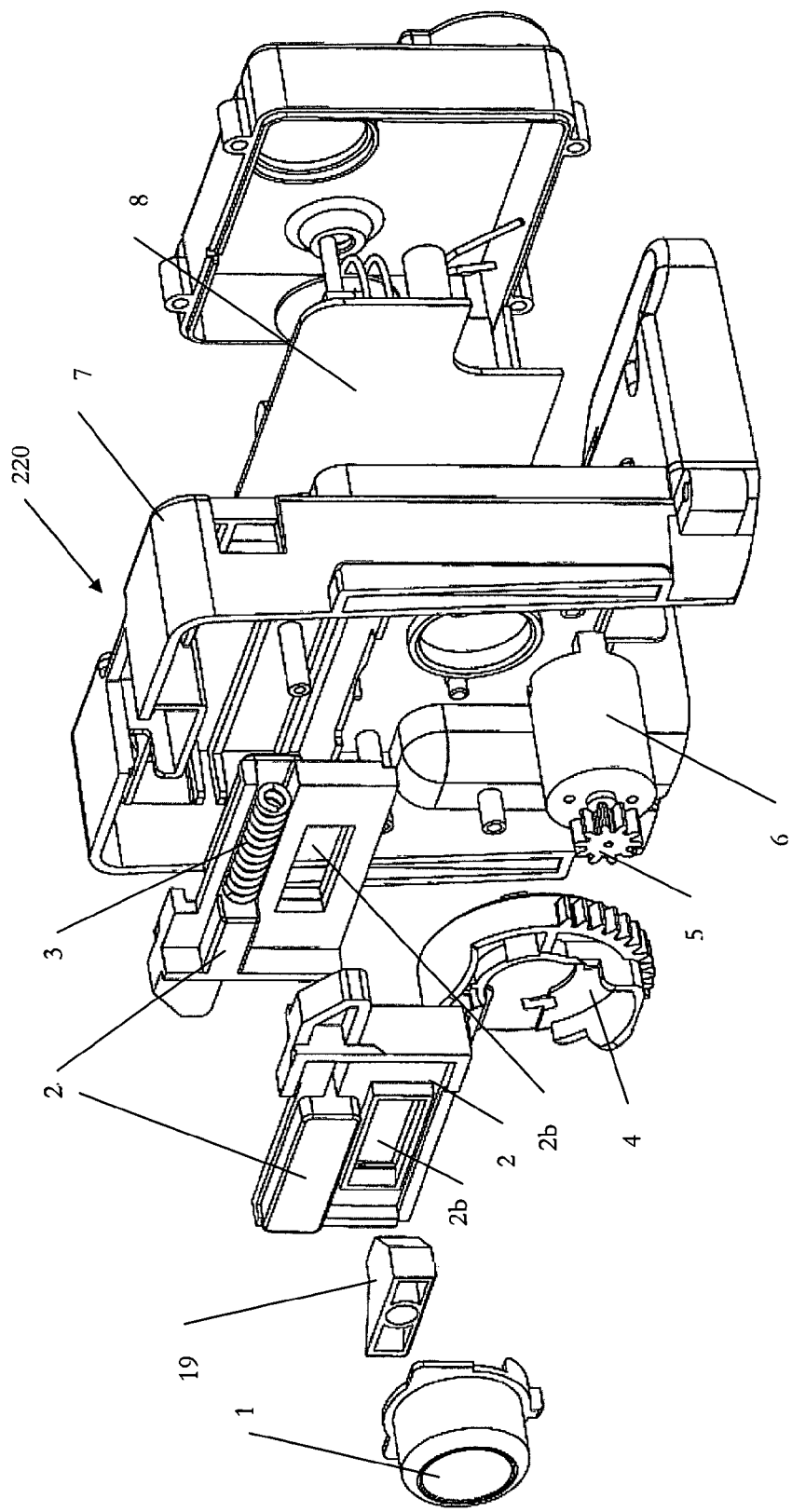
FIG. 1 is an exploded view of the lock assembly.
Figure 2:
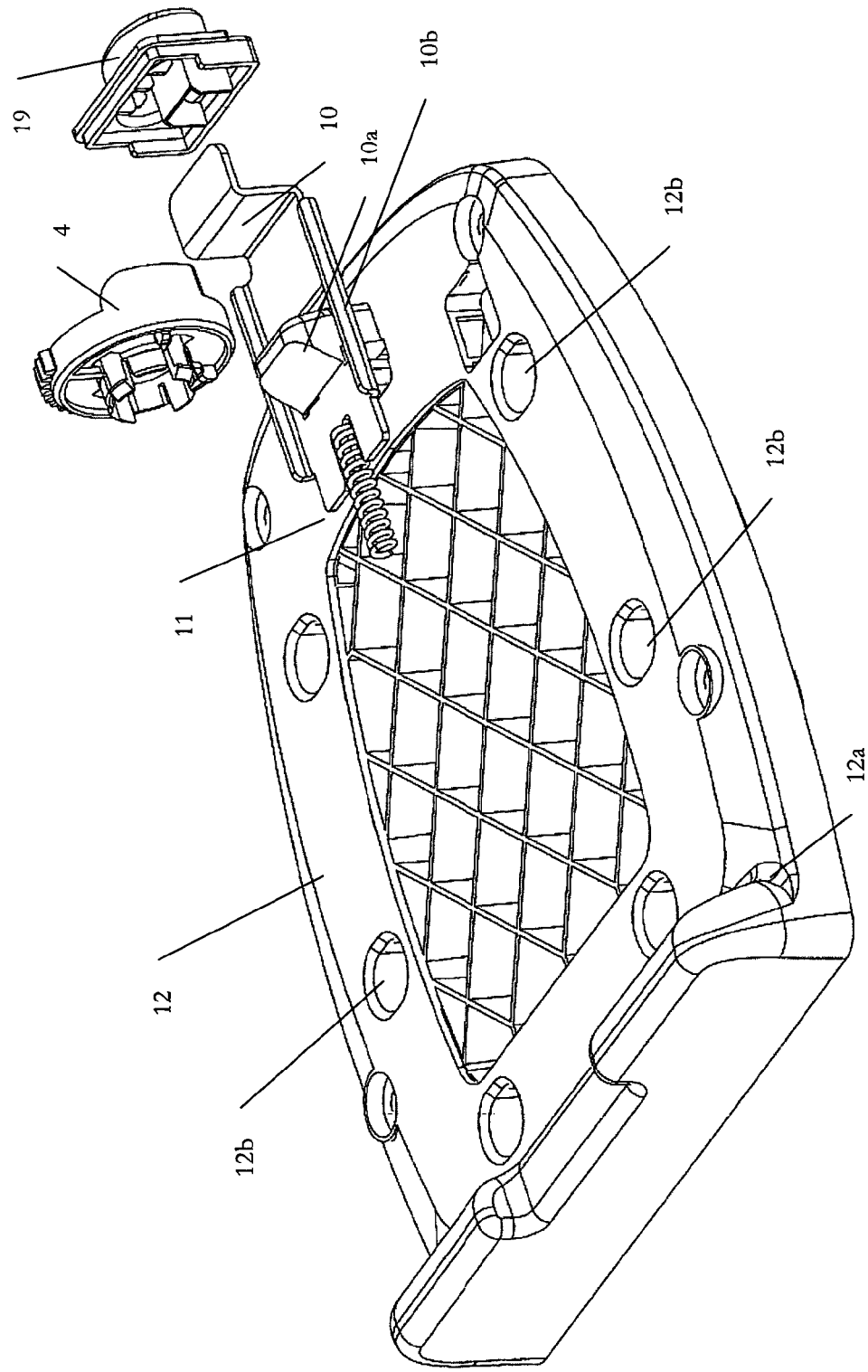
FIG. 2 is an exploded view of the frame securing assembly.
Figure 5:
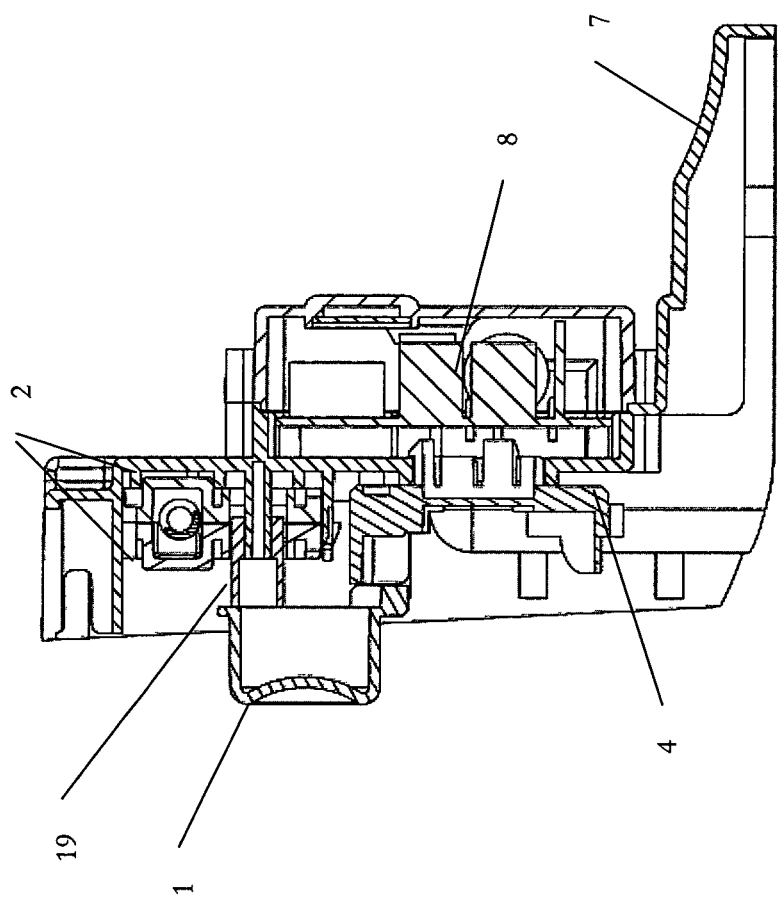
FIG. 5 is cross section of the lock assembly of FIG. 3.
Figure 6:
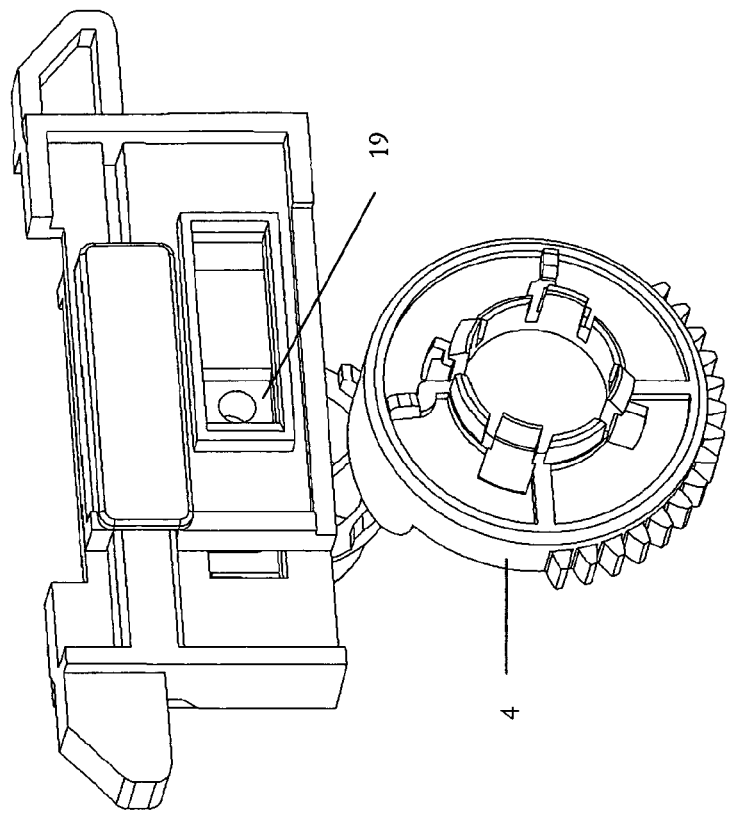
FIG. 6 is a front isometric view of the locking sub assembly in a locked position.
Figure 7:
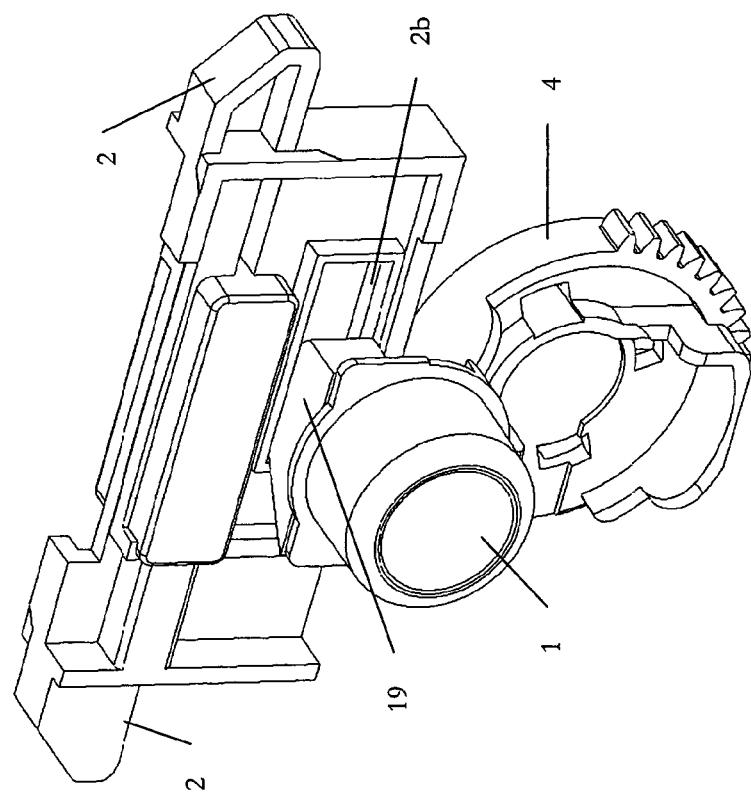
FIG. 7 is an a rear isometric view of the locking sub assembly in a locked position.
Figure 8:
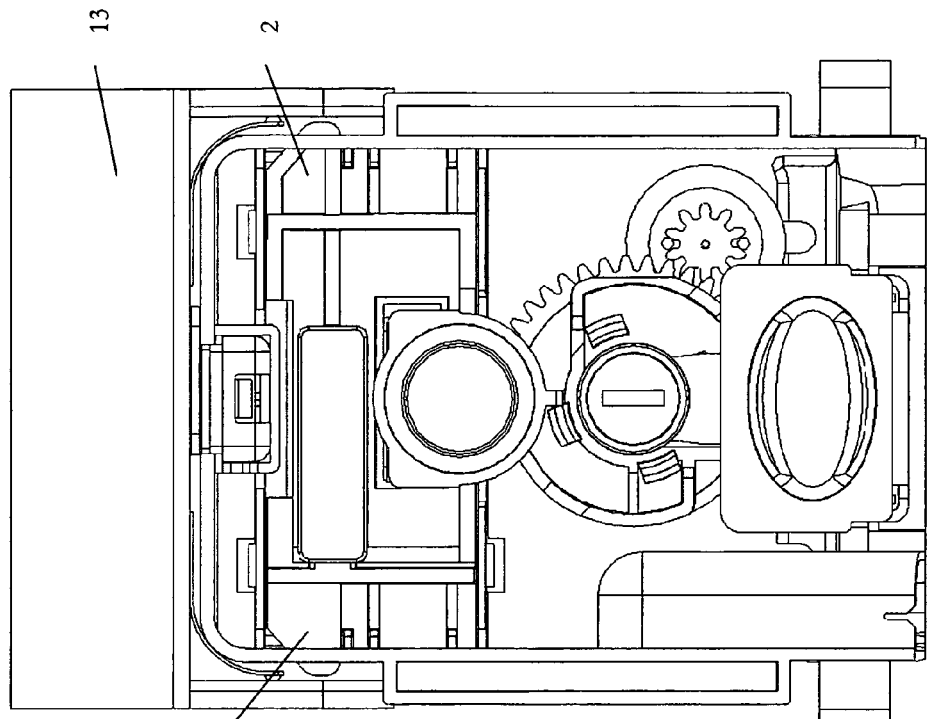
FIG. 8 is an isometric view of the lock assembly of FIG. 1 in an unlocked position.
Figure 9:
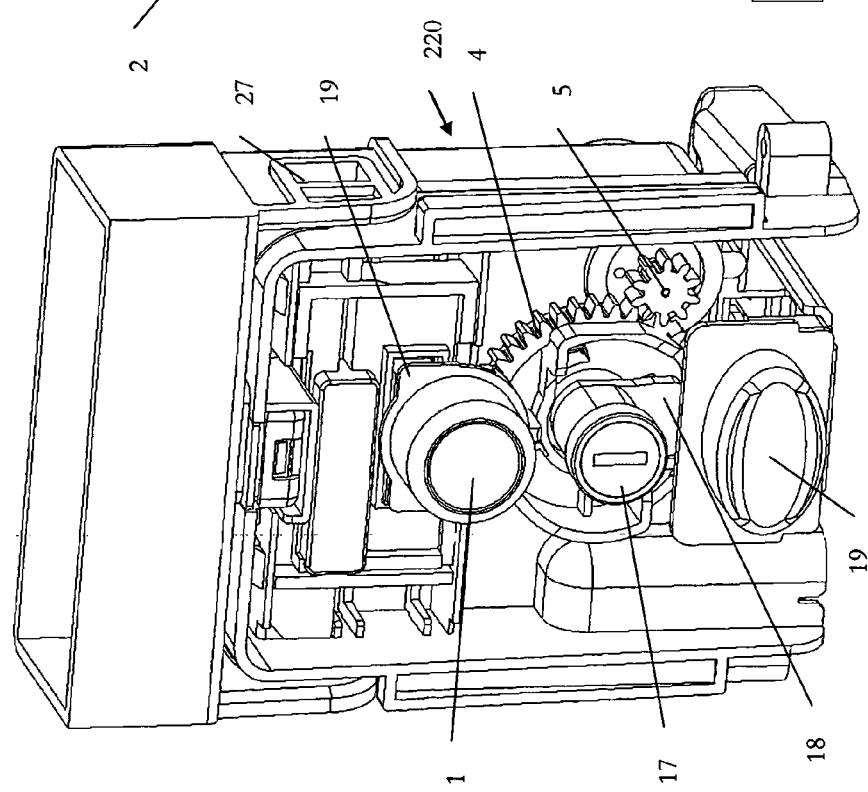
FIG. 9 is a front view of the locked, lock assembly of FIG. 8.
Figure 10:
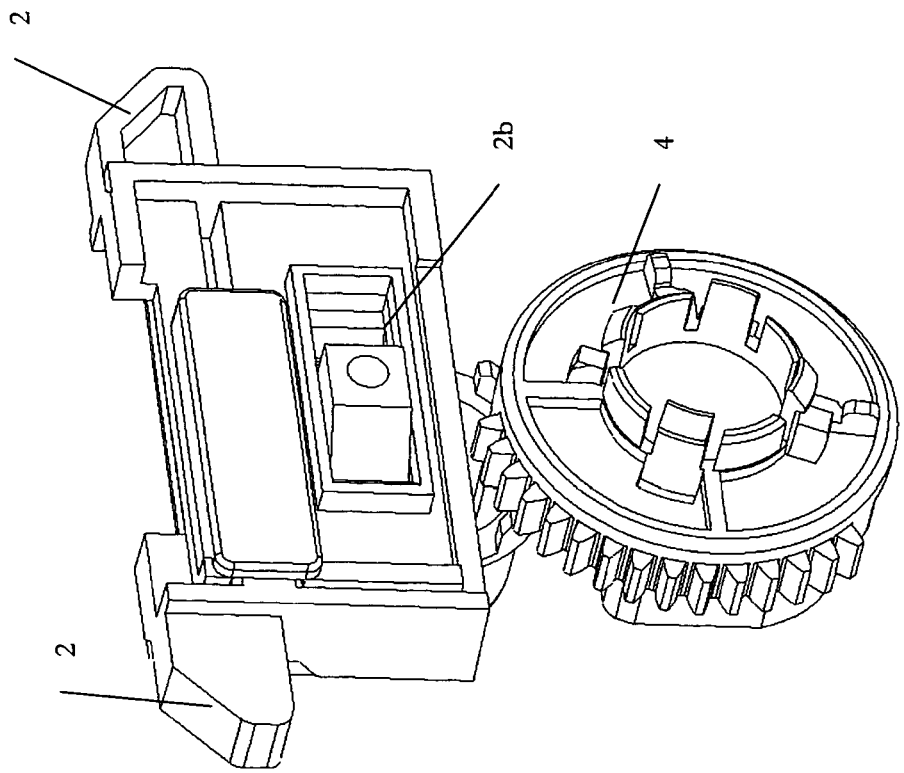
FIG. 10 is a front isometric view of the locking sub assembly in an unlocked position.
Figure 11:
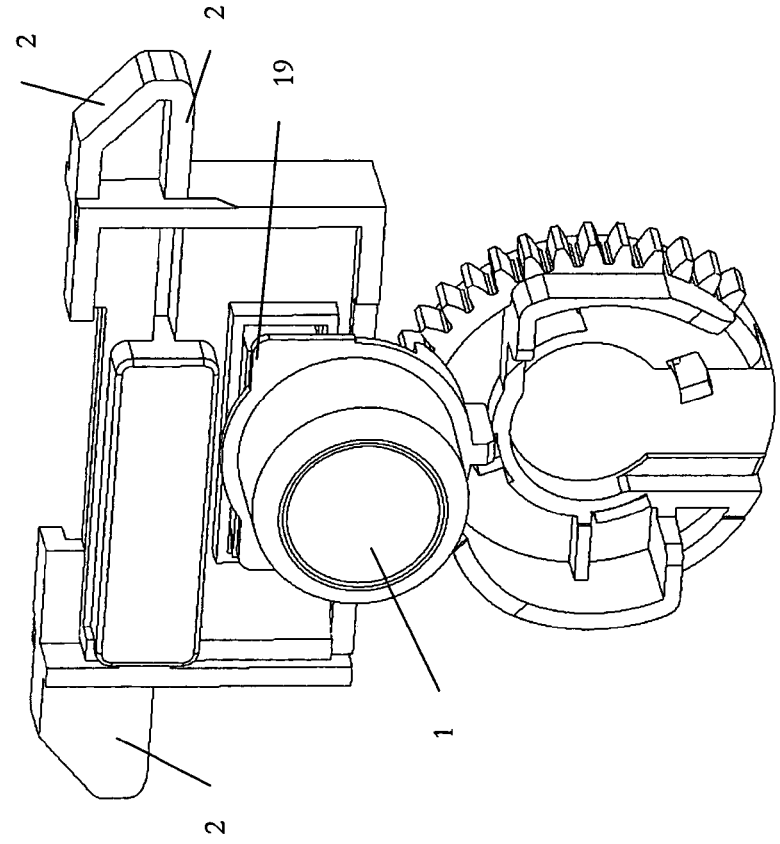
FIG. 11 is an a rear isometric view of the locking sub assembly in an unlocked position.

The locking mechanism 220 in addition to securing the lid 214 to the container 213 secures the container 213 to the frame 212. Referring particularly to FIGS. 2, 16 and 17 a plate 12 is bolted or otherwise secured to the frame 212 via holes 12b in the plate. A latch 10 that is slidable in a channel of the locking mechanism body 7. The slidable latch mechanism 10 is used to secure the container 213 to the plate 12. In particular a hole 10b in the latch 10 secures the container to a slot in a projection 10a, projecting from the plate 12. The latch 10 is biased in a position to secure the container 213 to the plate 12 by a compression spring 11. A button 9 on the end of the spring loaded mechanism allows a user to release the container 213 from the plate 12. By depressing the button 9, the button 9 depresses the latch 10 such that the latch is released from the projection 10a and the container 213 can be removed from the plate 12. A lip (not shown) on the container 213 is secured into a channel 12a of the plate so that the container 213 is in use secured to the plate 12 in at least two positions, that is by the lip and the latch 10.

Figure 22:
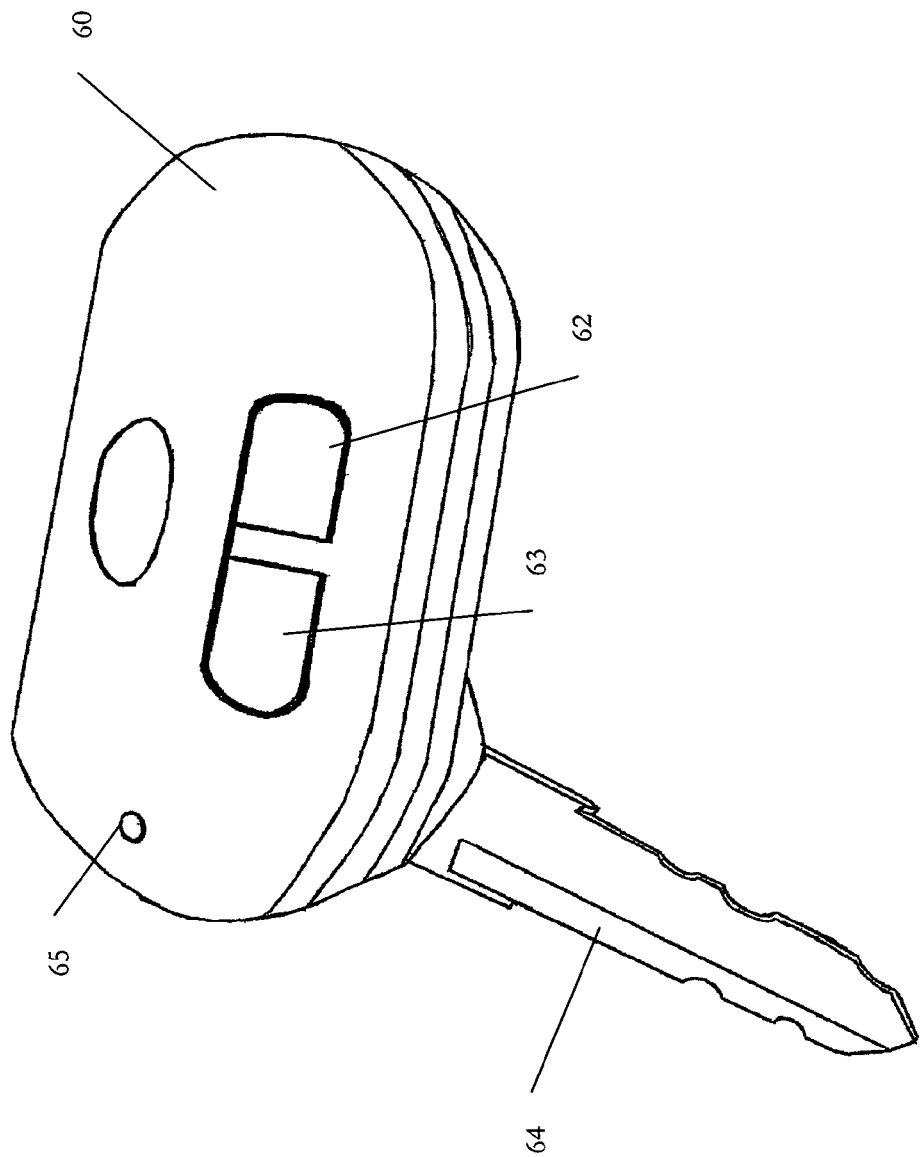
FIG. 22 is a view of the remote control mechanism of the present invention.

The motor controller 8 is controllable by a remote device 60 illustrated in FIG. 22 that operates remotely. Using the remote 60 allows the container 213 to be locked, as well as preventing the container 213 being removed from the frame 212 of the vehicle 211.

FIGS. 3 to 7 show the locking mechanism 220 in a locked position. The lid 214 has a lock plate 13 that is secured to the main locking mechanism housing 7. The positioning of the cam 4 prevents buttons 1 and 9 from operating. Cam projections 43, 44 on opposite edges of the cam 4 prevent the buttons 1, 9 from operating as the buttons are prevented by the projections from being pushed.

Button 9 operates to release the release mechanism of the lock bars 2 from the lid lock plate 13 as described above. A spring 14 provides assistance to separate the lid lock plate 13 from the main housing 7 when the lock bars are released. The lid lock plate 13 is attached to the lid 214 and is aligned with the main locking mechanism body 7.

FIGS. 8 to 11 show the locking mechanism 220 in an unlocked position. The cam projections are now located a quarter turn away from their original position and no longer prevent the buttons 1, 9 from operating. The buttons 1, 9 are operable to release the lid 214 from the container 213 and the container 213 from the plate 12.

Figure 12:
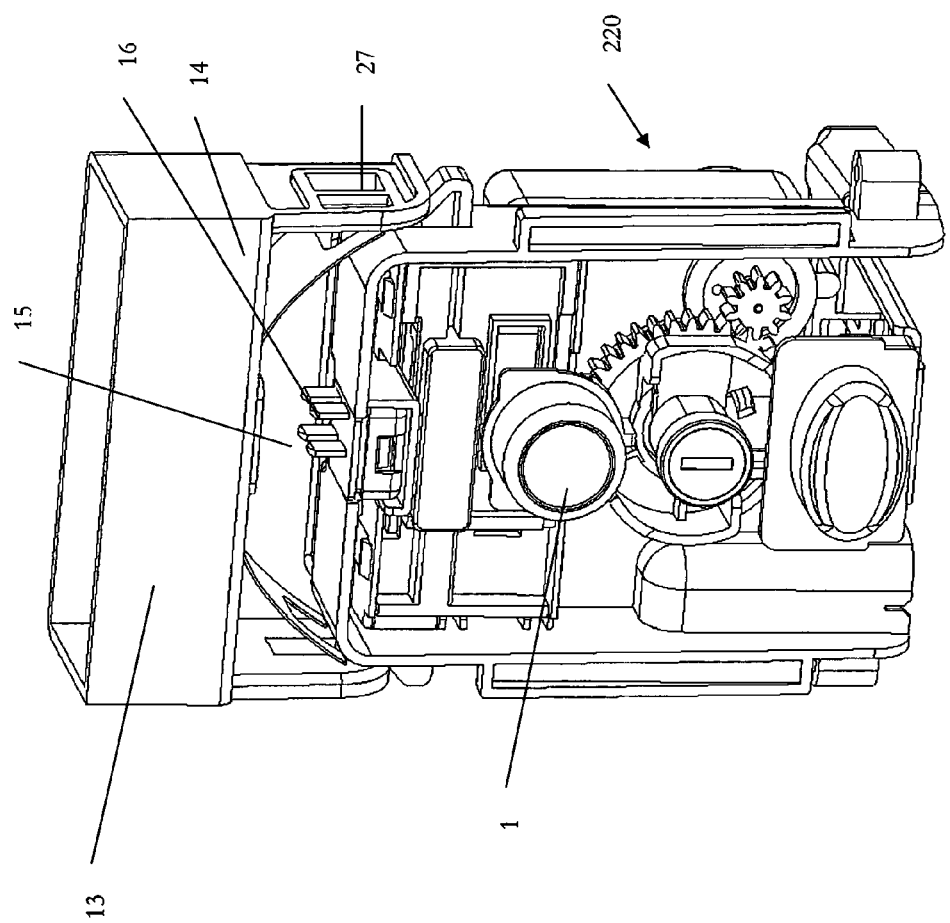
FIG. 12 is an isometric view of the lock assembly showing the lid latch open.

FIG. 12 shows an electrical connection mechanism 15, 16. A male connector part 16 is located at the top of the housing 7 and a corresponding female connector part 15 is located in the lid lock plate 13. When the lid 214 is secured to the container 213, the male connector part 16, and the female connector part 15, interlock to provide an electrical connection.

The electrical connection 15, 16 is typically used for a brake light 215 on the lid 214. In an alternative embodiment the electrical connection 15, 16 can also be used to provide an audible alarm connection.

Referring to FIGS. 13 to 15, a manually key operable lock 17 may override the controller 8. The key operable lock 17 includes a lever 18 that controls the operation of the cam 4. The cam 4 includes a quarter turn segment 50 in which the lock lever 18 can be rotated.

In a neutral position illustrated in FIG. 13, the cam 4 can be operated by the controller 8 as the quarter turn needed by the controller 8 and motor 6 to move the cam to the unlocked position as shown in FIG. 15 can be made. In this position the key 64 can be inserted and removed from the lock 17.

In a locked position illustrated in FIG. 14, the lever 18 prevents the controller 8 from turning the cam 4, and the cam 4 in turn prevents the buttons 1,9 from operating. As soon as the controller 8 and motor 6 attempt to move the cam 4 the lock lever 18 prevents the cam 4 from turning.

In an unlocked position illustrated in FIG. 15, the lock lever 18 moves the cam 4 to a position that allows the buttons 1 and 9 to operate thereby manually unlocking the luggage carrier. In this position the lid 214 may be opened and the carrier 210 removed from the plate 12.

Referring to FIG. 16, the cam 4 is shown in a locked position. This prevents the button 9 from operating the latch 10 to release the container from the plate 12. In FIG. 17 the cam 4 is in a position such that the button 9 can be pushed by a user to move the latch 10 thereby releasing the container 213 from the plate 12.

Figure 18:
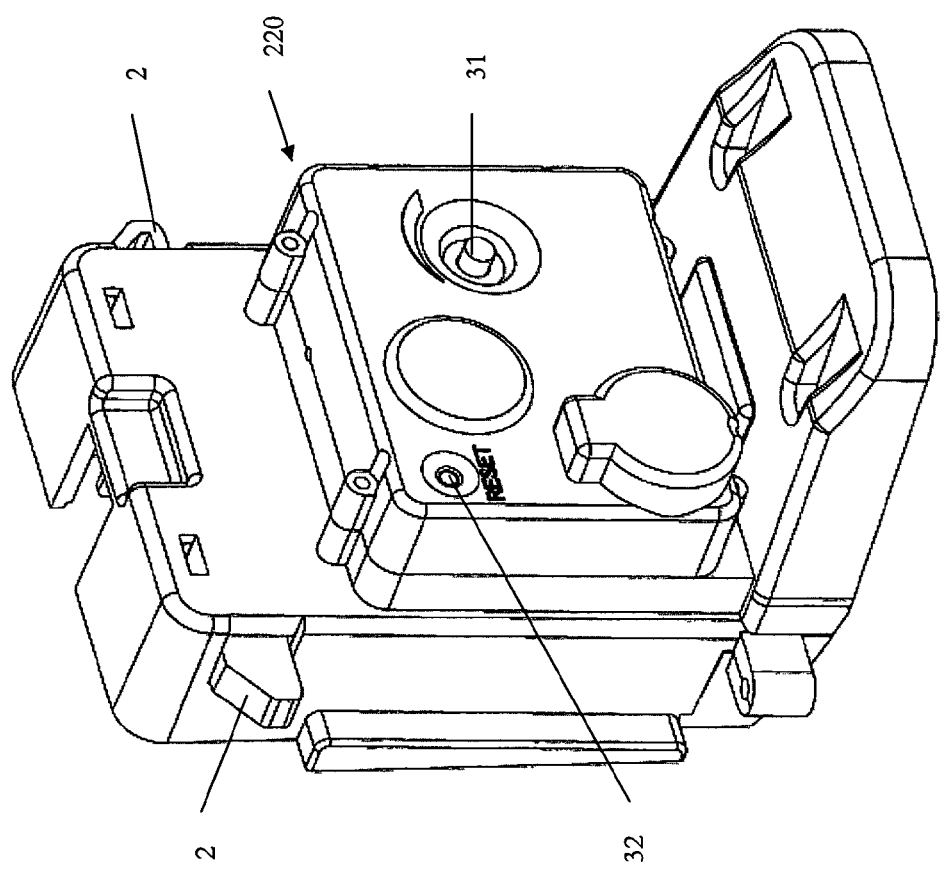
FIG. 18 is an isometric view of the assembled lock assembly.
Figure 19:
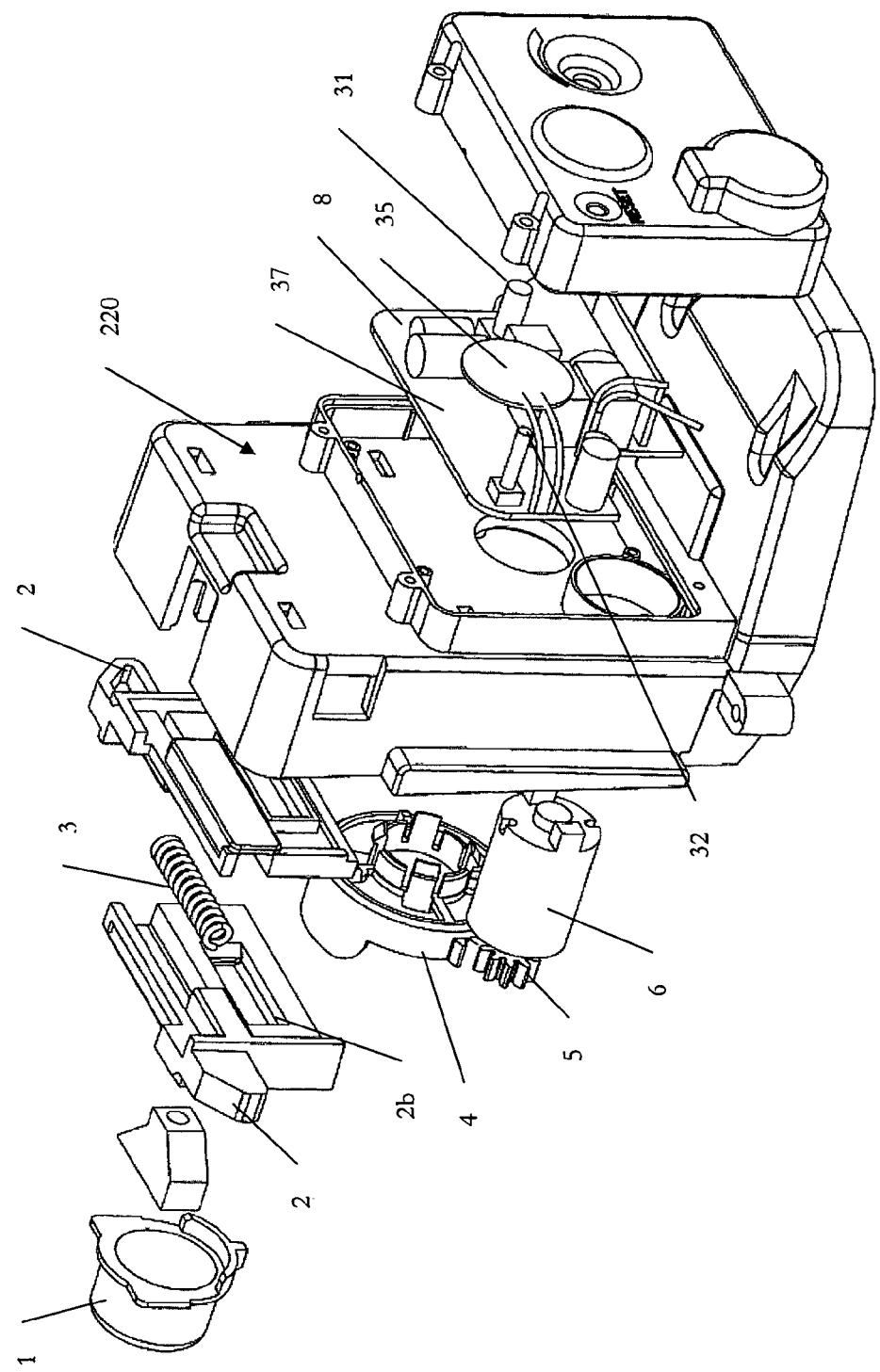
FIG. 19 is an exploded view from the back of the lock assembly of FIG. 1.

Referring to FIGS. 18 and 19 in particular, the luggage carrier 210 also includes an alarm system integral with the motor controller 8. "Motor Controller" and "Alarm System" are used interchangeable for the electronic circuits that control the motor 6 and provide an alarm.

The alarm system 8 is preferably powered by the motorcycle battery but also includes a rechargeable battery. The alarm system 8 has a speaker 35 to provide an audible alarm output with the alarm 8 is activated. The alarm system 8 comprises a number of electronic components mounted on a printer circuit board 37. The alarm system 8 includes a sensor to detect vibrations, knocks or other motion. To fine tune the sensor a variable resistor 31 is utilised. The alarm system 8 is operated by the remote control 60 illustrated in FIG. 22. The printer circuit board 37 also includes a remote reset button 32 so that the alarm system 8 and the remote control 60 can be reset in the event that the alarm 8 and remote 60 inbuilt security codes get out of sequence.

The remote control 60 and the alarm 8 communicate using radio frequency transmission that has a range of up to 30 meters.

The remote control 60 has two buttons on one surface of the control unit 60. One of the buttons 62 is used to turn the alarm 8 off and another button 63 is used to turn the alarm on. When the alarm 8 is turned off using button 62 the cam 4 is driven to the unlocked position. When the alarm 8 is turned on button 63 the cam 4 is driven to the locked position. In the preferred embodiment the remote 60 also includes an LED indicator 65 and a retractable key 64 that can be used to unlock the luggage carrier.

The alarm controller 8, using the electric motor 6, can lock and unlock the container 213. In the event that a thief tries to disconnect power to the alarm 8 the alarm 8 will sound using the rechargeable battery of the alarm system 8.

In a preferred embodiment in the alarm system 8 will automatically lock the luggage carrier 210 a short period of time after the luggage carrier 210 is unlocked. Three minutes is a particularly preferred time period.

The foregoing describes the invention including preferred forms thereof. Alterations and modifications as will be obvious to those skilled in the art are intended to be incorporated in the scope hereof as defined by the accompanying claims.

What is claimed is:

1. A luggage carrier for a two wheeled vehicle comprising:
    an open topped container releasably lockable to a frame of the two wheeled vehicle;
    a hinged lid releasably lockable to the open topped container;
    a brake light mounted on the hinged lid;

an interlocking power passing mechanism for operating the brake light wherein power to operate the brake light is disconnected when the hinged lid is operated to open the container;

a locking mechanism which releasably locks both the hinged lid to the container and the container to the frame, comprising:

a lock moveable between an unlocked position and a locked position via a neutral position;

a first manual release mechanism for releasing the lid from the container;

a second manual release mechanism for releasing the container from the frame; and a cam rotatable between a first position and a second position, wherein:

the cam in the first position prevents both the first manual release mechanism from releasing the lid from the container and the second manual release mechanism from releasing the container from the frame, and the cam in the second position allows both the first manual release mechanism to release the lid from the container and the second manual release mechanism to release the container from the frame, wherein, responsive to the lock being in the neutral position, the cam is rotatable between the first position and the second position, wherein, responsive to the lock being in the locked position, the cam is prevented from rotating to the second position; and wherein, responsive to the lock being moved from the locked position to the unlocked position, the cam is rotatable from the first position to the second position; and an alarm system for the luggage carrier that includes a remote control mechanism configured to send a signal to the alarm system that toggles the alarm system on and off, wherein toggling the alarm system on with the remote control mechanism causes the cam to rotate to the first position to prevent both the first manual release mechanism from releasing the lid from the container and the second manual release mechanism from releasing the container from the frame.

2. The luggage carrier of claim 1, wherein the locking mechanism comprises a lid lock bar releasably lockable with a lock plate attached to the lid, and a latch which is releasably lockable to the frame, wherein the lid lock bar is slidable along a lock bar axis, the direction of sliding being substantially perpendicular to the movement of the lock plate and the lid when the lid is being opened or closed and the cam is rotatable about a cam axis which is perpendicular to the lock bar axis.

3. The luggage carrier of claim 1, wherein the lock moves a lever and when the lock is in the locked position the lever prevents a motor from rotating the cam to the unlocked position.

4. The luggage carrier of claim 1, wherein the cam has a first cam projection rotatable with the cam which prevents the first manual release mechanism from unlocking the lid from the container when the cam is in the first position, and a second cam projection also rotatable with the cam which prevents the second manual release mechanism from releasing the container from the frame when the cam is in the first position.

5. The luggage carrier of claim 1, wherein the alarm system sounds an audible alarm output when power from a battery of the two wheeled vehicle to the alarm system is cut.

6. The luggage carrier of claim 5, wherein the alarm system comprises a rechargeable alarm battery that provides power to cause the alarm system to sound the audible alarm output when the power from the battery of the two wheeled vehicle to the alarm system is cut.

* * * * *